United States Patent
Kang et al.

(10) Patent No.: US 11,491,881 B2
(45) Date of Patent: Nov. 8, 2022

(54) METHOD AND SYSTEM FOR GUIDING ACCELERATOR PEDAL OF ELECTRIC VEHICLE

(71) Applicants: Hyundai Motor Company, Seoul (KR); Kia Motors Corporation, Seoul (KR)

(72) Inventors: Kyung Jin Kang, Gyeonggi-Do (KR); Soo Lim Han, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 260 days.

(21) Appl. No.: 16/596,037

(22) Filed: Oct. 8, 2019

(65) Prior Publication Data

US 2020/0361319 A1    Nov. 19, 2020

(30) Foreign Application Priority Data

May 17, 2019    (KR) .................. 10-2019-0057944

(51) Int. Cl.
    *B60L 15/20*    (2006.01)
    *B60K 35/00*    (2006.01)
    *B60K 26/02*    (2006.01)

(52) U.S. Cl.
    CPC .......... *B60L 15/2045* (2013.01); *B60K 26/02* (2013.01); *B60K 35/00* (2013.01)

(58) Field of Classification Search
    CPC ..... B60L 15/2045; B60K 26/02; B60K 35/00; B60K 6/387; B60K 6/445
    See application file for complete search history.

(56) References Cited

U.S. PATENT DOCUMENTS

| | | | | |
|---|---|---|---|---|
| 6,307,277 | B1 * | 10/2001 | Tamai | B60W 10/06 290/40 C |
| 8,352,150 | B2 * | 1/2013 | Hijikata | F02D 11/105 701/102 |
| 8,669,855 | B2 * | 3/2014 | Suzuki | B60W 50/14 340/438 |
| 9,176,515 | B2 * | 11/2015 | Maruyama | G05G 1/40 |
| 9,415,685 | B2 * | 8/2016 | Suzuki | B60K 6/365 |
| 10,215,117 | B2 * | 2/2019 | Ueda | F02D 41/04 |
| 2002/0062183 | A1 * | 5/2002 | Yamaguchi | B60K 6/543 903/905 |
| 2007/0176762 | A1 * | 8/2007 | Aoyagi | H01M 8/04589 340/439 |

(Continued)

FOREIGN PATENT DOCUMENTS

| | | | | |
|---|---|---|---|---|
| EP | 2055521 B1 * | 10/2010 | ............ | F02B 77/084 |
| EP | 2949823 A1 * | 12/2015 | ......... | B60R 16/0236 |

(Continued)

*Primary Examiner* — Luis A Martinez Borrero
(74) *Attorney, Agent, or Firm* — Fox Rothschild LLP (57) ABSTRACT

A method of guiding an accelerator pedal of an electric vehicle includes calculating a target instant fuel efficiency, calculating a target torque corresponding to the target instant fuel efficiency, calculating a target open degree of the accelerator pedal based on the target torque, receiving an actual open degree of the accelerator pedal manipulated by a driver, and displaying the target open degree of the accelerator pedal and the actual open degree of the accelerator pedal.

15 Claims, 4 Drawing Sheets

(56) References Cited

U.S. PATENT DOCUMENTS

| | | | | |
|---|---|---|---|---|
| 2008/0163811 | A1* | 7/2008 | Nakamichi | G01P 1/08 116/62.4 |
| 2008/0258891 | A1* | 10/2008 | Sato | B62M 6/45 340/439 |
| 2008/0300768 | A1* | 12/2008 | Hijikata | F02D 41/021 701/102 |
| 2009/0322503 | A1* | 12/2009 | Suzuki | B60W 20/00 903/902 |
| 2010/0009225 | A1* | 1/2010 | Saito | H01M 8/0494 429/406 |
| 2011/0153175 | A1* | 6/2011 | Zhang | B60W 50/14 701/110 |
| 2011/0257828 | A1* | 10/2011 | Levy | B60W 50/14 701/31.4 |
| 2012/0059563 | A1* | 3/2012 | Sakaguchi | B60K 26/021 701/70 |
| 2013/0074644 | A1* | 3/2013 | Sakaguchi | G05G 1/38 74/513 |
| 2013/0096895 | A1* | 4/2013 | Willard | G06F 30/15 703/8 |
| 2013/0173111 | A1* | 7/2013 | Syed | B60K 35/00 701/36 |
| 2013/0173129 | A1* | 7/2013 | Syed | B60W 50/14 701/70 |
| 2014/0012449 | A1* | 1/2014 | Arita | B60W 50/0098 180/65.21 |
| 2014/0109717 | A1* | 4/2014 | Maruyama | G05G 1/40 74/513 |
| 2014/0138172 | A1* | 5/2014 | Suzuki | B60K 6/442 903/903 |
| 2015/0012159 | A1* | 1/2015 | Honda | B60W 20/10 180/65.265 |
| 2016/0012163 | A1* | 1/2016 | Kim | G06F 30/20 703/8 |
| 2016/0121894 | A1* | 5/2016 | Seo | B60W 50/14 701/36 |
| 2016/0339780 | A1* | 11/2016 | Yagi | B60K 26/02 |
| 2017/0045009 | A1* | 2/2017 | Ueda | F02D 41/0215 |
| 2017/0066328 | A1* | 3/2017 | Yoon | B60K 35/00 |
| 2019/0163226 | A1* | 5/2019 | Kihara | G05G 1/38 |
| 2019/0220052 | A1* | 7/2019 | Kihara | B60T 7/06 |
| 2020/0257329 | A1* | 8/2020 | Kihara | G05G 5/12 |
| 2020/0384859 | A1* | 12/2020 | Higuchi | B60K 6/46 |
| 2021/0247272 | A1* | 8/2021 | Kodama | G05G 1/38 |

FOREIGN PATENT DOCUMENTS

| | | | | |
|---|---|---|---|---|
| WO | WO-2008050741 A1 * | 5/2008 | | F02B 77/084 |
| WO | WO-2014122785 A1 * | 8/2014 | | B60K 35/00 |

* cited by examiner

METHOD AND SYSTEM FOR GUIDING ACCELERATOR PEDAL OF ELECTRIC VEHICLE

This application claims under 35 U.S.C. § 119(a) the benefit of Korean Patent Application No. 10-2019-0057944, filed on May 17, 2019, which is incorporated by reference herein.

BACKGROUND

(a) Technical Field

The present disclosure relates to a method and system for guiding an accelerator pedal of an electric vehicle.

(b) Description of the Related Art

In general, an electric vehicle is driven using a motor as a power source and performs battery charging while consuming battery energy when the motor is in use. In this case, it takes a long time to charge the battery, and thus it is required to effectively use energy.

A driving force of a vehicle, which utilizes the most energy consumed in the battery, is determined depending on an amount the accelerator pedal is depressed by a driver, which may be referred to as an "open degree" of the accelerator pedal. To this end, in order to affect the open degree of the accelerator pedal depressed by the driver, pedal effort is not directly controlled, and according to the corresponding technology, visual information is provided to a cluster to display a specific vehicle state in order to depress the accelerator pedal by a lowest amount.

Conventionally, the provided visual information indicates whether economical driving is performed but does not propose a direct guideline. In other words, help is provided for the driver to understand economical driving, but is not at a level of actively guiding economical driving.

For example, a conventional level corresponds to a degree by which the driver checks an instant fuel efficiency gauge of a cluster, views a pop-up message, or recognizes a picture in which a driver takes his or her foot off an accelerator pedal and then adjusts the accelerator pedal to some extent. An effect of learning a current driving state as an "economically reasonable level" is largely dependent upon vehicle intelligibility, memory power, a vehicle body condition, and fitness of the driver.

That is, conventionally, a physical quantity unit of the visual information displayed on the cluster is different from the accelerator pedal. When a physical quantity of a gauge displayed on the cluster is power [Kw] or fuel efficiency [km/kWh], a physical quantity of the accelerator pedal is displayed as input [%], and thus there is a gap between the visual information and input of the accelerator pedal. Accordingly, an "absolute size of a specific physical quantity" or "displaying timing" represented by the length of the displayed gauge is different from the physical quantity of the accelerator pedal, and thus there is a problem in that input of the accelerator pedal is not intuitively displayed.

SUMMARY

An object of the present disclosure is to provide a method and system for guiding an accelerator pedal of an electric vehicle.

In particular, an object of the present disclosure is to provide a control method of displaying a target open degree of the accelerator pedal based on target instant fuel efficiency in the same physical quantity as input of a driver as a direct guide line.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of guiding an accelerator pedal of an electric vehicle includes calculating a target instant fuel efficiency, calculating a target torque corresponding to the target instant fuel efficiency, calculating a target open degree of the accelerator pedal based on the target torque, receiving an open degree of the accelerator pedal manipulated by a driver, and displaying the target open degree of the accelerator pedal and the actual open degree of the accelerator pedal.

In another aspect of the present disclosure, a system for guiding an accelerator pedal of an electric vehicle includes a motor unit configured to supply power to a vehicle, an input unit including a device for input for acceleration of the vehicle, a sensor unit configured to sense a signal related to driving of the vehicle, a controller configured to receive a velocity of the vehicle and an input quantity of the accelerator pedal of a driver from the sensor unit, to calculate a target instant fuel efficiency, to calculate a target torque corresponding to the target instant fuel efficiency, and to calculate a target open degree of the accelerator pedal based on the target torque, and an output unit configured to display the target open degree of the accelerator pedal and the input quantity of the accelerator pedal manipulated by the driver.

In a further aspect of the present disclosure, a non-transitory computer readable medium containing program instructions executed by a processor, includes: program instructions that calculate a target instant fuel efficiency; program instructions that calculate a target torque corresponding to the target instant fuel efficiency; program instructions that calculate a target open degree of the accelerator pedal based on the target torque; program instructions that receive an actual open degree of the accelerator pedal manipulated by a driver; and program instructions that display the target open degree of the accelerator pedal and the actual open degree of the accelerator pedal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In description of exemplary embodiments, it will be understood that, when an element is referred to as being "on" or "under" another element, the element can be directly on another element or intervening elements may be present.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

Figure 1:
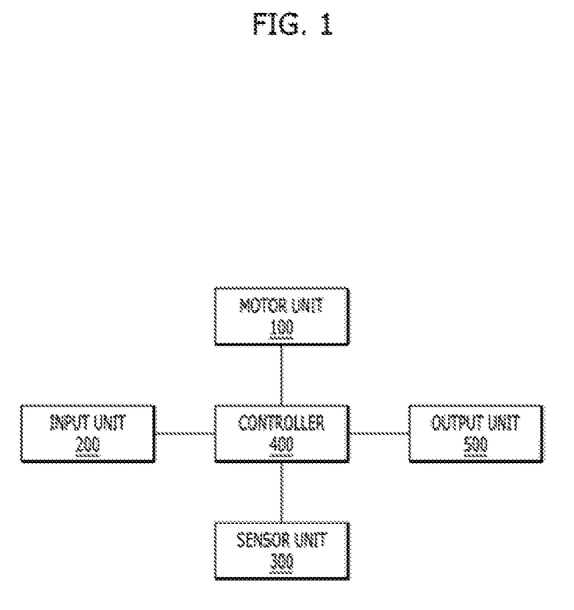
FIG. 1 is a diagram showing an accelerator pedal guidance system of an electric vehicle according to an embodiment of the present disclosure.

FIG. 1 depicts an accelerator pedal guidance system of an electric vehicle according to an embodiment of the present disclosure.

Referring to FIG. 1, the accelerator pedal guidance system may include a motor unit 100, an input unit 200, a sensor unit 300, a controller 400, and an output unit 500.

The motor unit 100 may provide power to a vehicle and may function as a generator to generate electrical energy during braking. The electrical energy generated by the motor unit 100 may be stored in a battery. The motor unit 100 may have a plurality of motor characteristics according to motor driving control. According to each characteristic of the motor unit 100, the acceleration performance and the fuel efficiency of the vehicle may be determined.

The input unit 200 may include an acceleration input device configured to receive input for acceleration of the vehicle from a user. In this case, the acceleration input device may be configured in the form of a pedal.

The sensor unit 300 may sense a signal related to driving of the vehicle, or the like. To this end, the sensor unit 300 may include a wheel sensor, a velocity sensor, a yaw sensor, a gyro sensor, a position module, a battery sensor, a fuel sensor, a tire sensor, an accelerator position sensor (APS), or the like.

The sensor unit 300 may sense an input quantity of the accelerator pedal according to manipulation by the driver and may monitor an actual open degree of the accelerator pedal according to manipulation of the accelerator pedal by the driver.

The controller 400 may be a vehicle control unit (VCU) configured to calculate a target open degree of the accelerator pedal. The controller 400 may calculate target instant fuel efficiency for each velocity based on the velocity of the vehicle, received from the sensor unit 300. That is, the controller 400 may calculate target instant fuel efficiency that satisfies optimum acceleration for each velocity.

The controller 400 may calculate torque based on the target instant fuel efficiency. To this end, the controller 400 may calculate instant fuel efficiency according to Equation 1 below.

$$\begin{aligned}\text{Instant fuel} \\ \text{efficiency}\end{aligned} = \frac{\begin{aligned}\text{Instant power} \\ \text{consumption}\end{aligned}}{\begin{aligned}\text{Instant} \\ \text{Velocity}\end{aligned}} = \frac{\begin{aligned}\text{Voltage} \times \text{Current} \\ \text{(Battery power} \\ \text{consumption)}\end{aligned}}{\text{Velocity}} \quad \text{[Equation 1]}$$

$$= \frac{2\pi \times \frac{RPM}{60} \times \text{Torque motor} \div \text{Efficiency} \atop \text{(motor power consumption)}}{\text{Velocity}}$$

$$= \frac{2\pi \times \frac{RPM}{60} \times \text{Torque} \div \text{Motor Efficiency}}{\text{Tire dyanmic radius} \times RPM \times \text{Velocity conversion Expression} + \text{Deceleration gear ratio}}$$

-continued $$= \frac{2\pi \times \text{Torque} \times \text{Deceleration gear ratio}}{\text{Tire dynamic radius} \times \text{Velocity conversion} \times \text{Expression} \times \frac{\text{Motor}}{\text{Efficiency}} \times 60}$$

Here, the other factors except for the instant fuel efficiency are each a constant.

Then, the controller 400 may calculate torque based on the calculated instant fuel efficiency. To this end, the controller 400 may calculate torque according to Equation 2 below.

$$\text{Torque} = \frac{60 \times \text{Tire dynamic radius} \times \text{Velocity conversion Expression} \times \frac{\text{Motor efficiency}}{\text{Instant field efficiency}}}{2\pi \times \text{Torque} \times \text{Deceleration gear ratio}} \quad [\text{Equation 2}]$$

As provided herein, the other factors except for the torque are each a constant.

The controller 400 may calculate the target open degree of the accelerator pedal based on target torque.

To this end, the controller 400 may calculate the target open degree of the accelerator pedal via a reverse operation according to a preset torque map based on velocity of the vehicle and the torque calculated according to Equation 1 above. The torque map will be described in detail with reference to FIG. 2.

The controller 400 may receive the open degree of the accelerator pedal depressed by the driver from the sensor unit 300.

The controller 400 may compare the calculated target open degree of the accelerator pedal and the received (actual) open degree of the accelerator pedal. To this end, the controller 400 may convert the target open degree of the accelerator pedal into a unit of the same physical quantity as the actual open degree of the accelerator pedal based on the torque map.

The output unit 500 may display information processed by the controller 400. For example, the output unit 500 may display vehicle relevant information. Here, the vehicle relevant information may include vehicle control information for direct control of the vehicle, or vehicle driving auxiliary information for driving guidance of a vehicle driver. In addition, the vehicle relevant information may include vehicle state information indicating a current vehicle state or vehicle driving information related to vehicle driving.

The output unit 500 may include a cluster configured to check vehicle state information or vehicle driving information. The cluster may be positioned on a dash board. As such, the driver may check information displayed on the cluster while keeping viewing a front side of the vehicle.

The output unit 500 may display the target open degree of the accelerator pedal and the actual open degree of the accelerator pedal, which are received from the controller 400. In this case, the output unit 500 may simultaneously display the actual open degree of the accelerator pedal and the target open degree of the accelerator pedal and may intuitively display a degree by which input of the accelerator pedal needs to be adjusted in order to achieve the target instant fuel efficiency. The target open degree of the accelerator pedal and the actual open degree of the accelerator pedal, which are displayed by the output unit 500, will be described below in detail with reference to FIG. 3.

Figure 2:
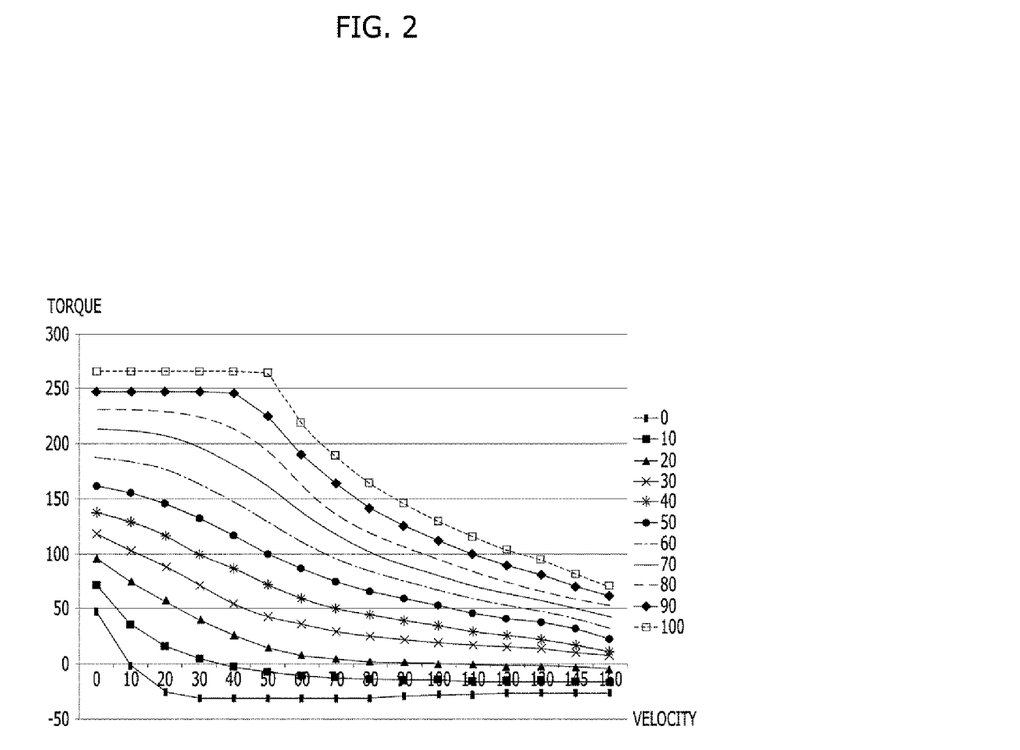
FIG. 2 is a graph showing a torque map according to an embodiment of the present disclosure.

FIG. 2 is a graph showing a torque map according to an embodiment of the present disclosure.

Referring to FIG. 2, the horizontal axis of the graph indicates velocity of a vehicle and the vertical axis of the graph indicates torque of the vehicle.

As shown in FIG. 2, the torque map may be data in which a correlation between the actual open degree of the accelerator pedal and torque corresponding to velocity of the vehicle is stored.

As such, the controller 400 may calculate torque based on the actual open degree of the accelerator pedal and the velocity according to the torque map. The controller 400 may reversely derive the target open degree of the accelerator pedal using the current velocity and the torque calculated based on the instant fuel efficiency as input.

Accordingly, the controller 400 may convert the calculated target open degree of the accelerator pedal into a unit of the same physical quantity as the actual open degree of the accelerator pedal according to the torque map. In this case, the actual open degree of the accelerator pedal and the target open degree of the accelerator pedal may be calculated in units of [%].

Figure 3:
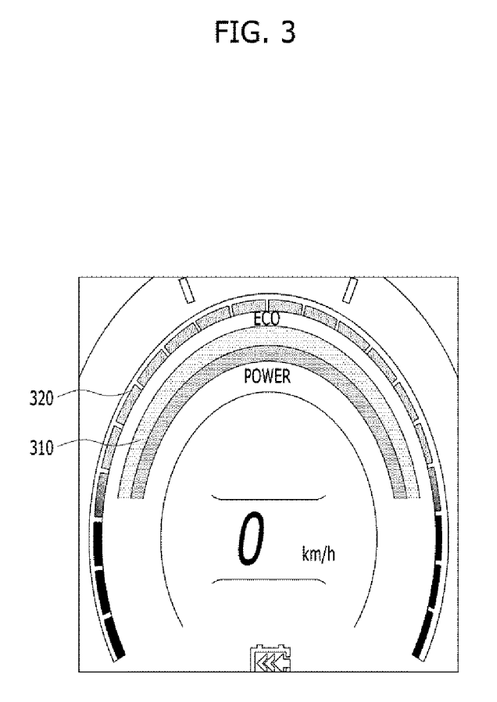
FIG. 3 is a diagram showing a display form of the output unit according to an embodiment of the present disclosure.

FIG. 3 is a diagram showing a display form of the output unit according to an embodiment of the present disclosure.

Referring to FIG. 3, the output unit 500 may display the target open degree of the accelerator pedal in the form of a gauge.

The gauge may be increased and decreased in response to the instant fuel efficiency. That is, with regard to the target open degree of the accelerator pedal, the instant fuel efficiency may be increased and decreased depending on the velocity of the vehicle and the actual open degree of the accelerator pedal, and accordingly, the target open degree of the accelerator pedal may be increased and decreased.

The output unit 500 may display the actual open degree of the accelerator pedal in the form of a gauge. In the output unit 500, the gauge may be increased and decreased depending on the actual open degree of the accelerator pedal according to input of the accelerator pedal as manipulated by the driver.

In this case, the output unit 500 may display the target open degree of the accelerator pedal and the actual open degree of the accelerator pedal in the form of respective independent gauges. As such, the output unit 500 may intuitively display a degree by which input of the accelerator pedal needs to be adjusted in order to achieve the target instant fuel efficiency.

In some embodiments, when a gauge 310 of the actual open degree of the accelerator pedal is longer than a gauge 320 of the target open degree of the accelerator pedal, the output unit may output a mark indicating an instruction to decrease the input of the accelerator pedal by the driver.

In some embodiments, when the actual open degree of the accelerator pedal is smaller than the gauge 320 of the target open degree of the accelerator pedal, the output unit 500 may output a mark indicating an instruction to increase the input of the accelerator pedal by the driver.

Figure 4:
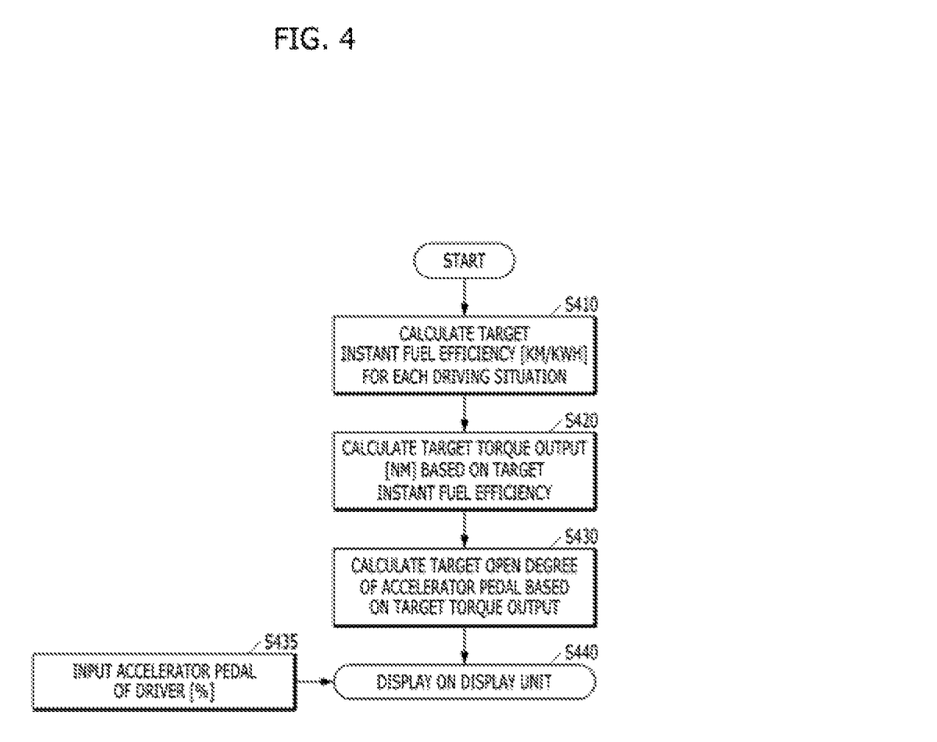
FIG. 4 is a flowchart showing a method of guiding an accelerator pedal of an electric vehicle according to an embodiment of the present disclosure.

FIG. 4 is a flowchart showing a method of guiding an accelerator pedal of an electric vehicle according to an embodiment of the present disclosure.

Referring to FIG. 4, the controller 400 may calculate target instant fuel efficiency [km/kWh] for each driving situation (S410). The controller 400 may calculate target instant fuel efficiency for each velocity based on the velocity of the vehicle, received from the sensor unit 300. That is, the controller 400 may calculate target instant fuel efficiency that satisfies optimum acceleration for each velocity.

After operation S410, the controller 400 may calculate target torque output [Nm] based on the target instant fuel efficiency (S420).

After operation S420, the controller 400 may calculate the target open degree of the accelerator pedal based on target torque output (S430). The controller 400 may calculate the target open degree of the accelerator pedal via a reverse operation based on the calculated torque and the velocity of the vehicle according to a preset torque map.

After operation S430, the controller 400 may receive the input of the accelerator pedal by the driver and may control the output unit 500 to display the input of the accelerator pedal and the target open degree of the accelerator pedal (S440). To this end, the controller 400 may convert the target open degree of the accelerator pedal into a unit of the same physical quantity as the actual open degree of the accelerator pedal based on the torque map, and may compare the target open degree of the accelerator pedal [%] and the received actual open degree of the accelerator pedal [%]. Then, the controller 400 may control the output unit 500 such as a cluster to simultaneously display the target open degree of the accelerator pedal and the actual open degree of the accelerator pedal.

The method and system for guiding an accelerator pedal of an electric vehicle according to the present disclosure may simultaneously display the target open degree of the accelerator pedal and the actual open degree of the accelerator pedal on the output unit such as a cluster, thereby guiding economical driving by the driver.

It will be appreciated by persons skilled in the art that that the effects that could be achieved with the present disclosure are not limited to what has been particularly described hereinabove and other advantages of the present disclosure will be more clearly understood from the detailed description.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

What is claimed is:

1. A method of guiding an accelerator pedal of an electric vehicle, the method comprising:
calculating, by a controller, a target instant fuel efficiency based on a velocity of the vehicle, wherein the target instant fuel efficiency satisfies an optimum acceleration for the velocity of the vehicle;
calculating, by the controller, a target torque corresponding to the target instant fuel efficiency;
calculating, by the controller, a target open degree of the accelerator pedal based on the target torque;
receiving, by the controller, an actual open degree of the accelerator pedal manipulated by a driver; and
displaying, by an output unit, the target open degree of the accelerator pedal and the actual open degree of the accelerator pedal as respective independent gauges, wherein one of the gauges for the target open degree is configured to be increased or decreased depending on the target instant fuel efficiency that corresponds to the velocity of the vehicle.

2. The method of claim 1, wherein the target torque corresponding to the target instant fuel efficiency is calculated according to an equation below:

$$\text{Torque} = \frac{\text{Tire dynamic radius} \times \text{Velocity conversion Expression} \times \text{Motor efficiency} \times 60 \times \text{field efficiency}}{2\pi \times \text{Torque} \times \text{Deceleration gear ratio}}$$

where remaining factors except for the target torque are each a constant.

3. The method of claim 2, wherein calculating the target open degree of the accelerator pedal includes calculating the target open degree of the accelerator pedal via a reverse operation according to a preset torque map based on the calculated target torque and velocity of the electric vehicle.

4. The method of claim 3, further comprising converting the target open degree of the accelerator pedal into a unit of a same physical quantity as the actual open degree of the accelerator pedal based on the torque map.

5. The method of claim 4, wherein the torque map is data in which the actual open degree of the accelerator pedal and torque corresponding to the velocity of the electric vehicle are stored.

6. The method of claim 1, wherein displaying the target open degree of the accelerator pedal and the actual open degree of the accelerator pedal includes comparing the target open degree of the accelerator pedal and the actual open degree of the accelerator pedal.

7. The method of claim 6, wherein displaying the target open degree of the accelerator pedal and the actual open degree of the accelerator pedal includes simultaneously outputting the target open degree of the accelerator pedal and the actual open degree of the accelerator pedal.

8. A non-transitory computer readable medium containing program instructions executed by a processor, the computer readable medium comprising:
program instructions that calculate a target instant fuel efficiency base on a velocity of the vehicle, wherein the target instant fuel efficiency satisfies an optimum acceleration for the velocity of the vehicle;
program instructions that calculate a target torque corresponding to the target instant fuel efficiency;
program instructions that calculate a target open degree of the accelerator pedal based on the target torque;

program instructions that receive an actual open degree of the accelerator pedal manipulated by a driver; and program instructions that display the target open degree of the accelerator pedal and the actual open degree of the accelerator pedal as respective independent gauges, wherein one of the gauges for the target open degree is configured to be increased or decreased depending on the target instant fuel efficiency that corresponds to the velocity of the vehicle.

9. A system for guiding an accelerator pedal of an electric vehicle, comprising:
- a motor unit configured to supply power to a vehicle;
- an input unit including a device for input for acceleration of the vehicle;
- a sensor unit configured to sense a signal related to driving of the vehicle;
- a controller configured to receive velocity of the vehicle and an input quantity of the accelerator pedal of a driver from the sensor unit, to calculate a target instant fuel efficiency based on the velocity of the vehicle, wherein the target instant fuel efficiency satisfies an optimum acceleration for the velocity of the vehicle, to calculate a target torque corresponding to the target instant fuel efficiency, and to calculate a target open degree of the accelerator pedal based on the target torque; and
- an output unit configured to display the target open degree of the accelerator pedal and the input quantity of the accelerator pedal manipulated the driver as respective independent gauges, wherein one the gauges for the target open degree is configured to be increased or decreased depending on the target instant fuel efficiency that corresponds to the velocity of the vehicle.

10. The system of claim 9, wherein the controller calculates the target torque corresponding to the target instant fuel efficiency according to Equation 2 below:

$$\text{Torque} = \frac{\text{Tire dynamic radius} \times \text{Velocity conversion Expression} \times \text{Motor efficiency} \times \frac{\text{Instant}}{60 \times \text{field efficiency}}}{2\pi \times \text{Torque} \times \text{Deceleration gear ratio}} \quad [\text{Equation 2}]$$

where remaining factors except for the target torque are each a constant.

11. The system of claim 10, wherein the controller calculates the target open degree of the accelerator pedal via a reverse operation according to a preset torque map based on the calculated target torque and velocity of the electric vehicle.

12. The system of claim 11, wherein the controller converts the target open degree of the accelerator pedal into a unit of a same physical quantity as the actual open degree of the accelerator pedal based on the torque map.

13. The system of claim 12, wherein the torque map is data in which the actual open degree of the accelerator pedal and torque corresponding to the velocity of the vehicle are stored.

14. The system of claim 9, wherein the controller compares the target open degree of the accelerator pedal and the actual open degree of the accelerator pedal.

15. The system of claim 14, wherein the controller simultaneously outputs the target open degree of the accelerator pedal and the actual open degree of the accelerator pedal.

* * * * *